United States Patent

Seki et al.

[15] 3,635,809

[45] Jan. 18, 1972

[54] ELECTRODEPOSITION COATING PROCESS OF VINYLIDENE FLUORIDE RESIN

[72] Inventors: Shigeru Seki; Kouji Sato, both of Iwaki-shi, Japan

[73] Assignee: Kureha Kagaku Kogyo Kabushiki Kaisha, Tokyo, Japan

[22] Filed: Apr. 28, 1969

[21] Appl. No.: 819,979

[30] Foreign Application Priority Data

Apr. 26, 1968 Japan........................43/28201

[52] U.S. Cl........................................204/181
[51] Int. Cl.........................................B01k 5/02
[58] Field of Search................................204/181

[56] References Cited

UNITED STATES PATENTS 2,820,752   1/1958   Heller....................204/181

Primary Examiner—Howard S. Williams
Attorney—Sughrue, Rothwell, Mion, Zinn & Macpeak

[57] ABSTRACT

An electrodeposition process which comprises electrophoretically depositing a vinylidene fluoride resin on an electrical conductor from a solvent mixture consisting essentially of a vinylidene fluoride resin powder dispersion in an organic liquid dispersing medium, said organic liquid dispersing medium comprising an organic liquid having a dielectric constant greater than 3.8 and being selected from the group consisting of organic liquids having a solubility parameter of from about 7.0 to about 13.0, exhibiting a low degree of hydrogen bonding, a solubility parameter of from about 7.7 to about 12.5 exhibiting a middle degree of hydrogen bonding, a solubility parameter of from about 9.6 to about 11.8 exhibiting a high degree of hydrogen bonding, and mixtures thereof.

13 Claims, No Drawings 3,635,809

ELECTRODEPOSITION COATING PROCESS OF VINYLIDENE FLUORIDE RESIN

BACKGROUND OF THE INVENTION

1. Field of the Invention

The present invention relates to an electrodeposition coating process for vinylidene fluoride resin.

More specifically, the present invention is concerned with an electrodeposition coating process comprising using an organic dispersion of vinylidene fluoride resin.

2. Description of the Prior Art

Vinylidene fluoride resin has excellent characteristics with respect to weather resistance, light resistance, abrasion resistance, various strengths, and its film-forming ability, and therefore it is suitable for anticorrosion coatings, especially for outdoor coatings. Usage in this field has very recently expanded greatly.

There have hitherto been proposed coating processes for this material for this purpose. For example, in solution processes there are problems that the required thickness of the film cannot be obtained unless the coating operation is repeated. Further, the loss of solvent is heavy, and recovery is thus necessitated. In addition, dropping, running, etc., result, and not enough is formed on the edge portions, with the result that uniformity of the film is hard to obtain.

In powder fluidized processes, a thick film is necessitated to obtain a uniform film free of pinholes, and this economical disadvantage is unavoidable.

Further, in the case of using an organosol, dispersing fine powder of vinylidene fluoride resin in a suitable organic solvent in the paste state, coating complicated shapes is impossible because of the very high viscosity.

In comparison with these processes, an electrodeposition coating process has, in general, excellent characteristics, and often obviates the deficiencies of the heretofore known processes.

In electrodeposition coating, as is generally known, a dispersion is allowed to deposit on the surface of the object to be coated by electrophoresis (hereinafter, the deposit is referred to as an electrodeposition film), whereupon the dispersion turns into an insoluble normal film (hereinafter, merely referred to as film). In fact, even from dispersions of a low resin concentration, an electrodeposition film is obtained which has a high resin concentration. Further, complicatedly shaped objects may be uniformly coated, "sharp edge" parts may be sufficiently coated, and dropping, running, etc., are prevented. This obviously enables the deficiencies in the processes which have been heretofore used to be largely overcome.

In electrodeposition coating processes heretofore utilized, water has generally been used as the dispersion medium, or else aqueous solutions of water-soluble resins have been used. This results in other electrochemical phenomena occurring along with electrophoresis on the formation of electrodeposition film, which gives rise to unavoidably eluting metal ions of an anode. In the deposition of a vinylidene fluoride resin, the elution of metal ions from an anode makes electrodeposition coating substantially difficult. Specifically, with an emulsion polymerization solution of vinylidene fluoride, the resin electrodeposition coating varies greatly, depending upon the electrodeposition condition and pH. Various additives have been attempted to stop the elution of metal ions, but this could not be prevented in all cases. Accordingly, coloring, decomposition of the resin, mudcracking and peeling off of the film arises during the process of preparing the film with heat-melting, and it is thus impossible to obtain a film with satisfactory properties.

The present invention reduces the elution of such metal ions to the lowest possible degree, and enables the formation of films fully fit for use in a one cycle operation.

SUMMARY OF THE INVENTION

Improved electrodeposition of vinylidene fluoride resin is obtained by a unique combination of vinylidene fluoride resin powder and an organic liquid which is utilized to form a vinylidene fluoride resin dispersion coating composition. The organic liquid which is utilized to form the vinylidene fluoride resin dispersion must possess a dielectric constant greater than 3.8, and must also have a solubility parameter within the range 7.0–13.0 when the organic liquid illustrates a low degree of hydrogen bond contribution, a solubility parameter from 7.7–12.5 when the organic liquid illustrates a middle degree of hydrogen bond contribution, and a solubility parameter of from 9.6–11.8 when the organic liquid illustrates a high degree of hydrogen bond contribution. The above may be utilized singly or in combinations thereof.

Basically, an electrophoretic coating process is utilized, and the vinylidene fluoride resin is dispersed in any suitable form, such as a powder, into an organic liquid, or mixture of organic liquids, meeting the above characteristics.

It is an object of the present invention to provide an electrodeposition coating method.

It is another object of the present invention to provide a practical method for the electrodeposition coating of vinylidene fluoride resin.

It is still another object of the present invention to provide an improved method for the electrodeposition coating of vinylidene fluoride by the use of an organic solvent as the dispersion solution medium.

It is yet another object of the present invention to make possible the obtaining of an excellent and yet remarkably easy obtained film on the surface of an object to be coated.

A further object of the present electrodeposition coating process is to provide a method for obtaining an excellent film on the surface of an object to be coated.

Yet a final object is to provide an electrodeposited film exhibiting excellent resistance to corrosion, especially for use as an exterior coating with excellent characteristics as to weather, light and abrasion resistance.

Yet a further object of the present invention is to provide a film coating, which is colorless and without pin holes, characterized by excellent anticorrosion, weather, light and abrasion resistances, and which has various improved strengths.

DESCRIPTION OF THE PREFERRED EMBODIMENTS

The present inventors have found that by using a suitable organic solvent as the dispersion medium for a vinylidene fluoride resin powder, the elution of metal ions from an anode may be almost completely prevented, and that consequently, a colorless, transparent and pinholeless continuous film may be obtained.

In other words, a vinylidene fluoride resin (powder) is dispersed in an organic solvent of the present invention to form a bath and an object to be coated is set therein, as an anode. A carbon electrode is used as a cathode. When direct current is applied, the elution of metal ion is prevented, and vinylidene fluoride resin powder migrates towards the anode to electrodeposit on the surface of the anode. Thereafter, the object to be coated is taken out of the electrodeposition solution, treated in any suitable manner, and then put in a furnace to dry and be heated, thereby obtaining a colorless, transparent smooth surface, and thereby completing coating.

The present inventors have studied extensively electrodeposition coating process for vinylidene fluoride resin, and as a result have found that a dispersion medium capable of forming an electrodeposition film sufficient for practical use should illustrate a dielectric constant greater than 3.8. They have further found that some dispersion mediums having a dielectric constant more than 3.8 do not form electrodeposition films, and that these can be characterized by their solubility parameter.

The solubility parameter (hereinafter referred to as $SP$) can be represented by $SP=(CDE)^{1/2}$ and is the degree of interaction between two substances, essentially indicating solubility. The term (CDE) represents cohesive energy density. The SP is calculated by the use of known physical constants or else by the determination of unknown constants. There are various methods for determination of this parameter, for instance: a method for calculating from the evaporation energy, Hildebrand's method [(The solubility of Nonelectrolytes, 3rd edition, Reinhold, Publishing Corp., N.Y.)(1949)]; and Small's method [(J. Appl. Chem.) 3, 75(1953)], which is a method for calculating from surface tension. Further Burrell [Official Digest 27, 726(1955)] has evaluated SP values for numerous solvents by the evaporation energy method. These were calculated from the equation:

$$SP=(CDE)^{1/2}=\left(\frac{\Delta E}{V}\right)^{1/2}=\left(\frac{\Delta H-RT}{V}\right)^{1/2}$$

Where $\Delta H$ is latent heat of evaporation of $T°K.$; $V$ is the molecular volume; and $R$ is the gas constant. The degree of interaction was not completely explained only by reference to the SP, but proved to be dependent to a correction term used with reference to the intermolecular force between the same kind of molecules.

For the hydrogen bond, W. Gordy [(J. Chem: Phys.)7, 93(1939); 8, 170(1940); 9, 204 (1941)] has indicated the degree of hydrogen bonding of the solvent by means of a shift in the wavelength ($\Delta\nu$) of the infrared absorption (3.73$\mu$) due to the stretching vibration of O–D, when various solvents are mixed with $CH_3OD$, and have shown that these degrees can be classified largely into three groups.

Burrel has indicated the contribution of the intermolecular force between the same kind of molecules in relation to hydrogen bond, and has classified the contributions (hereinafter, referred to as $\gamma$) of the hydrogen bond into three classes, "Low" (L), "Middle" (M) and "High" (H), on the basis of the results obtained by W. Gordy. It is not made clear exactly what values Burrell has taken as the boundary values of $\Delta\nu$ in this classification. However, the present inventors have examined and compared values actually measured by W. Gordy and Burrell's classification, and as a result have found that $\Delta\nu(cm.^{-1})$ is roughly in accord with Burrell's classification, if the supposition is made that lower than 50 is "Low" (L), 50 to 150 is "Middle" (M) and higher than 150 is "High" (H). These $\Delta\nu$ values have been adopted as the boundary values of $\gamma$.

Examples are shown in the following table.

| Dispersion medium | SP | $\Delta\nu$ (cm.⁻¹) | $\gamma$ |
|---|---|---|---|
| Nitrobenzene | 10.0 | 28 | L |
| Chlorobenzene | 9.5 | 15 | L |
| Diisobutyl ketone | 7.8 | 84 | M |
| Acetone | 10.0 | 97 | M |
| Pyridine | 10.7 | 181 | H |
| Ethylene glycol | 14.2 | 206 | H |

From the results obtained by the present inventors for the case of a vinylidene fluoride dispersion, it was proven that the formation of an electrodeposition film was possible in a dispersion medium having an SP value of 7.0 to 13.0 when the dispersion medium has a L$\gamma$; in a dispersion medium having an SP value of 7.7 to 12.5 when the dispersion medium has an M$\gamma$, and in a dispersion medium having an SP value of 9.6 to 11.8 when the dispersion medium has an H$\gamma$. For example dioxane has an M$\gamma$ and a 9.9 SP value. However, it has a 2.23 dielectric constant. Further, ethyl alcohol has a 27.0 dielectric constant, an H$\gamma$ and a 12.7 SP value. Accordingly, either is impossible to use in electrodeposition. Examples of dispersion mediums capable of use in electrodeposition (various single dispersion mediums) are shown in table I. In addition, examples of mediums incapable of use in electrodeposition are shown in table II.

TABLE I.—DISPERSION MEDIA CAPABLE OF USE IN ELECTRODEPOSITION

| Dispersion medium | Dielectric constant | SP | $\gamma$ |
|---|---|---|---|
| n-Octyl alcohol | 10.3 | 10.3 | H |
| n-Amyl alcohol | 14.7 | 10.9 | H |
| Isobutyl alcohol | 18.9 | 11.0 | H |
| DOP | 5.7 | 8.9 | M |
| DBP | 6.4 | 9.4 | M |
| DEP | 8.0 | 9.9 | M |
| Butyl acetate | 5.0 | 8.5 | M |
| Isoamyl acetate | 4.5 | 8.3 | M |
| Methyl acetate | 6.7 | 9.6 | M |
| Ethyl acetate | 6.1 | 9.1 | M |
| Cyclohexanone | 18.3 | 9.9 | M |
| Methyl-n-propyl ketone | 15.1 | 8.9 | M |
| Diisobutyl ketone | 11.3 | 7.8 | M |
| Methyl ethyl ketone | 17.8 | 9.3 | M |
| Acetone | 21.4 | 10.0 | M |
| Acetophenone | 17.8 | 8.4 | M |
| Butylcellosolve | 16.5 | 8.9 | M |
| Epichlorohydrin | 22.6 | 10.1 | M |
| Chloroform | 4.8 | 9.4 | L |
| 1,2-dichloroethane | 10.5 | 9.8 | L |
| 1,1,2-trichloroethane | 6.3 | 9.3 | L |
| Tetrachloroethane | 5.2 | 9.5 | L |
| Nitrobenzene | 35.7 | 10.0 | L |
| Cholorobenzene | 5.9 | 9.5 | L |
| Nitroethane | 28.1 | 11.1 | L |
| o-Dichlorobenzene | 9.9 | 10.0 | L |

TABLE II.—DISPERSION MEDIA NOT CAPABLE OF USE IN ELECTRODEPOSITION

| Dispersion medium | Dielectric constant | SP | $\gamma$ |
|---|---|---|---|
| Methyl alcohol | 33.2 | 14.5 | H |
| Ethyl alcohol | 27.0 | 12.7 | H |
| Acetic acid | 9.7 | 12.6 | H |
| Ethylene glycol | 37.7 | 14.2 | H |
| Benzyl alcohol | 13.1 | 12.4 | H |
| n-Propyl alcohol | 20.1 | 12.1 | H |
| Diethyl ether | 4.3 | 7.4 | M |
| Dioxane | 2.23 | 9.9 | M |
| Toluene | 2.38 | 8.9 | L |
| Benzene | 2.28 | 9.2 | L |
| n-Octane | 1.85 | 7.8 | L |
| Carbon tetrachloride | 2.24 | 8.6 | L |
| Ethylbenzene | 2.4 | 8.7 | L |
| Carbon bisulfide | 2.7 | 10.0 | L |
| p-Xylene | 2.58 | 8.8 | L |
| Tetralin | 2.66 | 9.5 | L |

Furthermore, the present inventors have examined mixed solvents and have found that these are much more useful; is, that electrodeposition may be performed using not only a single dispersion medium within said range, but also with mixed solvents thereof. Further, mixed solvents consisting of a dispersion medium in the said range and a dispersion medium outside the range may even be used if at suitable mixing ratio.

To explain somewhat the meaning of said "suitable mixing ratio," i.e., using dispersion media shown in (I) within said range and dispersion media shown in (II), outside said range, there are some cases where excess dispersion medium (II) prohibits electrodeposition, i.e., where a unified parameter cannot be found even with numerous combinations. This differs depending upon the respective combination, and therefore the mixing ratio must be determined experimentally, In any case, such a mixture may not be used in the electrodeposition coating of the present invention unless a solvent which is primarily of dispersion media (I) is used (greater than 50 percent). The possibility of electrodeposition in such a mixed dispersion media is very valuable in respect of the various properties which cannot be obtained by the use of a single dispersion medium.

For example, an electrodeposition film formed by an electrodeposition process is successively dried and heated at a temperature which will sufficiently melt the resin (in accordance with conventional techniques) to thereby form a pinholeless, uniform film. To form such a film which is fully fit for practical use, a dispersion medium suitable for electrodeposition and a drying and heating process should be used. In order to meet all these requirements at the same time, mixed dispersion media are very effective.

In addition to the above, in the electrodeposition process of the present invention, similar to ordinary electrodeposition processes, the thickness of film may be changed by regulating the voltage, electrical current, time, etc., and dropping, running, etc., may also be completely prevented.

In the electrodeposition process according to the present invention, electric current flow is very low. This is unlike ordinary electrodeposition. In ordinary electrodeposition processes, a satisfactory electrodeposition film may not be obtained by an electric current density as low as is operable in the present invention. In fact, according to the present invention, even low electric current density leads to the formation of an electrodeposition film; therefore the electric power consumed is low, and economic advantages are thus realized.

Further, according to the method of the present invention not only can a vinylidene fluoride resin per se be electrodeposited, but electrodeposition with the adding of various kinds of additives is possible; that is, the use of systems formed by dispersing various kinds of pigments or fillers into an organic dispersion of vinylidene fluoride resin using organic solutions or mixtures thereof as defined by the present invention is possible. Both resin and additives are simultaneously electrodeposited on the same electrode by this procedure. The film formed of polyvinylidene fluoride resin contains the pigment or filler uniformly dispersed therein, and does not significantly differ from films formed by ordinary methods. The addition of various kinds of additives improves the properties of the film of polyvinylidene fluoride resin, is very useful economically and enlarges the range of applicability of the electrodeposition coating of polyvinylidene fluoride resin of the present invention.

In the case of dispersing pigment or filler to be added to the organic dispersion medium, this material will have an electric charge depending upon the substance. When there is electrodeposited carbon black, for example, this migrates towards the cathode, because of its positive charge. On the other hand, silica migrates toward the anode because of its negative charge. Thus, additives will have their respective charges according to the kind and properties of the additive.

However, the present inventors have found that in a system wherein various kinds of additives together with polyvinylidene fluoride resin are utilized, such additives act together with the polyvinylidene fluoride resin, in spite of the type of charge that they have when used as a single system. Specifically, in either case, that is when the pigment or filler added has a negative charge or a positive charge (opposite to the polyvinylidene fluoride resin) both types will migrate towards the anode together with the polyvinylidene fluoride resin, and may be electrodeposited at the same time as the resin. This particular facet is very unexpected, especially with respect to those additives having an opposite electric charge from the anode. Thus, when positive and negatively charged particles are subjected to electrophoresis, they surprisingly do not migrate in opposite directions from each other, but migrate in the same direction as the migrating direction of the polyvinylidene fluoride resin.

Moreover, this provides the capability of carrying out simultaneous electrodeposition by only simple mixing and dispersing. This is preferable and far easier than the heretofore known simultaneous deposition processes, wherein various activators which control the charge of each particle are added, since it does not adversely affect the film formed.

According to the present invention, it is necessary to consider the ratio of the various kinds of additives to the polyvinylidene fluoride resin in order to carry out such a simultaneous electrodeposition. When additives having an opposite charge to the vinylidene fluoride resin are used, they behave as if the charges on both are neutralized with respect to each other, and therefore the addition of a large quantity of additive makes electrodeposition very difficult. However, the quantity of these charges will vary with the kind of properties, shape of the substance, and with the kind of dispersion medium, and thus it is not possible to provide a simple determinative rule.

However, since the properties of the film formed by adding these various additives might undergo some changes, and increased quantities of the additives may adversely affect properties such as the mechanical, chemical, and weather-resistant properties, the quantity of additives is preferably maintained at a ratio of less than 30 percent, preferably less than 15 percent, with respect to the polyvinylidene fluoride.

The following examples are offered to more adequately define the invention.

EXAMPLE 1

Into a diethyl oxalate dispersion solution, there was dispersed an amount of vinylidene fluoride resin powder sufficient to yield a diethyl oxalate with a 10 percent resin concentration. Into this there was placed an aluminum anode to carry out electrodeposition. The distance between electrodes was 2 cm. and conditions were 100 v., for 2 minutes. The electric current density was 60 $\mu A./cm^2$. Subsequently, the electrodeposition film was dried and heated at 220° C. for 20 minutes to obtain the film. The film obtained was colorless, transparent and pinholeless. The thickness of the film was $51\mu$.

EXAMPLE 2

A mixed dispersion media consisting of 80 parts of dimethyl phthalate and 20 parts of diisobutyl ketone with a 10 percent vinylidene fluoride resin concentration was formed in a container. There was placed therein an aluminum anode to carry out electrodeposition. Operation was at an electrode distance of 2 cm. with a voltage of 100 v. for an electrodeposition time of 2 minutes. The film was removed, dried and heated for 20 minutes. The film obtained was uniform, colorless, transparent and had a smooth surface. The edge portions of the Al plate were thoroughly coated, and without pinholes.

EXAMPLE 3

A dispersion solution with an 8 percent resin concentration identical to that of example 2 was formed. Electrodeposition was carried out under the same conditions as in example 2 for 1 minute, 2 minutes, 3 minutes, 4 minutes and 6 minutes, respectively. All films were removed, dried and heated in the same manner as in example 2, to obtain the final film. The thicknesses of the film were $4\mu$, $7\mu$, $15\mu$ and $22\mu$. From these results, the conclusion was reached that the thickness of the film can be easily controlled by the deposition time, if other conditions are constant.

EXAMPLE 4

A mixed dispersion medium consisting of 50 parts of cyclohexane and 50 parts of dimethyl phthalate with a 10 percent vinylidene fluoride resin content was formed. Electrodeposition with the use of Sn, Cr, Al, Ni, Fe, Cu anodes at the following conditions was conducted: voltage: 100 v.; distance between electrodes: 2 cm.; electrodeposition time: 1 minute. The films were removed, dried and heated in the same manner as heretofore described. The films obtained were transparent, uniform, pinholeless and continuous.

The respective amounts electrodeposited were 4.0 mg./cm.$^2$(Sn), 8.5 mg./cm.$^2$(Cr), 5.3 mg./cm.$^2$(Al), 6.6 mg./cm.$^2$(Ni), 44 mg./cm.$^2$(Fe) and 7.1 mg./cm.$^2$(Cu).

EXAMPLE 5

Into a dispersion as in example 4, an aluminum plate was placed as an anode to carry out electrodeposition. The conditions used were: distance between electrodes: 2 cm.; electrodeposition time: 2 minutes; voltage 100 v. 200 v., 300 v., 400 v. and 450 v. to obtain films. The films obtained were transparent, pinholeless and continuous. The respective amounts electrodeposited were 11.8 mg./cm.$^2$, 22.2 mg./cm.$^2$, 37.5 mg./cm.$^2$, 48.3 mg./cm.$^2$ and 51.1 mg./cm.$^2$.

EXAMPLE 6

By varying the mixing ratio of a mixed media of butyl acetate and benzene, electrodeposition properties of a resultant film were examined to give the results shown in the following table, electrodeposition being proven not to result in a media with a dielectric constant less than 3.8. Electrodeposition conditions, drying and heating conditions were as in example 1.

| Butyl acetate | Benzene, parts | Dielectric constant | Electrodeposition was— |
|---|---|---|---|
| Parts: | | | |
| 10 | 40 | 2.9 | Impossible. |
| 25 | 25 | 3.6 | Do. |
| 40 | 10 | 4.5 | Possible. |

EXAMPLE 7

To a fine powdered polyvinylidene fluoride resin there was added a uniform carbon black at various ratios. The carbon black was uniformly dispersed with the resin into a mixed solution of [dimethyl phthalate (80 parts) + diisobutyl ketone (20 parts)] by means of ball mill. Using this dispersion, electrodeposition coating was carried out on an aluminum plate anode at a voltage of 100 v., a distance between electrodes of 2.5 cm. Thereafter the product was dried at 180° C. for 10 minutes, heated at 250° C. for 10 minutes, and then heated at 300° C. for 1 minute. The result is shown in the following table.

When the amount of carbon black added was increased, the electrodeposition amount decreased. When the amount was further increased the stability of dispersion lowered and the electrodeposition film was weakened. The content of carbon black when is most preferably less than 10 percent, based on the polyvinylidene fluoride resin.

In the range of minimal coloring amounts to 10 percent carbon black acts as a black pigment, and also acts as filler, but does not so decrease the mechanical strength of the film formed by electrodeposition of such a dispersion (containing up to 10 percent carbon black) that the film "peels," the film adhesion in fact being improved. This was shown by the fact that a transparent film similarly formed (without carbon black) "peels" off upon being dipped into boiled water at 100° C. for 30 minutes.

It is believed that the volume contraction with the lowering of the expansion coefficient is small, and that the addition of such additives is especially important for polyvinylidene fluoride usage in the coating of complicated shapes by the electrodeposition coating method.

| C content (percent) | 0 | 5 | 10 |
|---|---|---|---|
| Electrodeposition amount: | | | |
| (2 minutes (mg./cm.$^2$) | 7.5 | 6.6 | 4.3 |
| (3 minutes) | 12.0 | 9.5 | 6.0 |

EXAMPLE 8

To fine powders of polyvinylidene fluoride resin there was added 0.1 percent of chromophthal—Blue (Ciba Corp.). This organic blue pigment was dispersed as in example 3, or dissolved partly, and allowed to electrodeposit on an aluminum plate anode at 400 v. with a 2 cm. electrode distance for 10 seconds. Thereafter, the product was dried as in example 7 and heated at 280° C. for 5 minutes. The film obtained was transparent with a bluish color, and did not suffer discoloring under heating. This film is fully fit for use as a colored film.

EXAMPLE 9

To fine powders of polyvinylidene fluoride resin* (*10 percent resin concentration, by weight.) there was added 30 percent titanium white (based on the resin) and the mixture was uniformly dispersed into a mixed solution of [dimethyl phthalate (80) + diisobutyl ketone (20)] by means of ball mill. With the use of this dispersion an electrodeposition film was formed on an Al plate anode at 400 v. with a 2.5 cm. electrode distance and a 1 minute deposition time. Thereafter, the product was dried and heated at 200° C. for 5 minutes, and at 300° C. for 1 minute. Deposition was proportional to time (see table).

For the film obtained, the TiO$_2$ content was 32.1 percent. Within computational errors, it is believed that titanium white of the same content as the solution composition was thus proven to electrodeposit simultaneously with the resin. The amount capable of being electrodeposited at 100 v. at a 2.5 cm. electrode distance is shown in the following table. The amount is proportional to time at low times, but the rate decreases somewhat as the total time increases. However, the thickness of the film basically corresponds to a sphere wherein the electrodeposited amount is linearly proportional to time. Thus, control of film thickness is possible by control of the time of electrodeposition.

In the absence of polyvinylidene fluoride, titanium white is electrodeposited on the cathode.

The film system, formed by adding titanium white, is fully fit for use as a white film, and yet the TiO$_2$ has the effect of a filler. The preferred content of TiO$_2$ is less than 30 percent, with less than 10 percent being most preferred.

| Time (min.) | 1 | 2 | 3 | 4 | 6 | 8 |
|---|---|---|---|---|---|---|
| Electrodeposition amount (mg./cm.$^2$) | 8.5 | 14.3 | 23.0 | 31.4 | 45.0 | 61.0 |

To further aid in an understanding of the present invention, generally, the polyvinylidene resin most preferably has a specific viscosity within the range 0.6–2.0, although resins outside this range are operable. The polyvinylidene fluoride powder generally must have a particle size within the range 0.01–10 microns, most preferably 0.1–1 micron although values somewhat outside this range will be operable. The deposition voltage may vary greatly, for instance within the range one volt to several thousand volts, but is most preferably maintained within the range 20–1,000 volts. Needless to say, the deposition current must be correlated with the voltage and is generally quite small, for instance, a few microamperes to a few milliamperes per square centimeter. The deposition time will, of course, be decided by the desired film thickness. Generally, a time of a few minutes is acceptable. Further, it will be appreciated that dielectric constants of almost any degree may be utilized, but most preferably the dielectric constant should be limited to a maximum of 150. The temperature and pressure of deposition are generally normal pressure and at room temperature, though, of course, this may vary so long as operation is not interfered with. The size of the additives utilized in the present invention may generally vary from about 0.05–10 microns in a most preferred embodiment thereof. Needless to say, sizes beyond this range can be utilized. Unless otherwise indicated, all percentages in the specification are by weight. Further, although the cathodes utilized in the examples were carbon, almost any conductive material may be utilized as the cathode, for instance, iron, stainless steel, nickel, copper, zinc, and the like, may be utilized. Further, the "drying" and "heating" of the present invention are usually within the following ranges: drying 80°–280° C.; heating 180°–350° C.

Although the present invention has been adequately described in the foregoing specification and examples included therein, it is readily apparent that various changes and modifications may be made without departing from the spirit and scope thereof.

What is claimed is:

1. An electrodeposition process which comprises electrophoretically depositing a vinylidene fluoride resin on an electrical conductor from a solvent mixture consisting essentially of a vinylidene fluoride resin powder dispersion in an organic liquid dispersing medium, said organic liquid dispersing medium comprising an organic liquid having a dielectric constant greater than 3.8 and being selected from the group consisting of organic liquids having a solubility parameter of from about 7.0 to about 13.0, exhibiting a low degree of hydrogen bonding, a solubility parameter of from about 7.7 to about 12.5 exhibiting a middle degree of hydrogen bonding, a solubility parameter of from about 9.6 to about 11.8 exhibiting a high degree of hydrogen bonding, and mixtures thereof.

2. The process of claim 1, wherein said vinylidene fluoride resin powder dispersion in said organic liquid dispersing medium further contains at least one additive selected from the group consisting of pigments and fillers, the amount of said additive being less than 30 percent based on the amount of vinylidene fluoride resin.

3. The process of claim 2, wherein said additive is present in an amount of less than 15 percent based on the amount of vinylidene fluoride resin.

4. The process of claim 2 wherein said additive is selected from the group consisting of titanium dioxide and carbon black.

5. The process of claim 2, wherein the particle size of said additive ranges from 0.05 to 10.0 microns.

6. The process of claim 1 which further comprises drying and heating said electrophoretically deposited resin.

7. The process of claim 6, wherein said drying occurs at a temperature of from 80° to 280° C., and said heating occurs at a temperature of from 180° to 350° C.

8. The process of claim 1, wherein said vinylidene fluoride powder has a particle size of from 0.01 to 10 microns.

9. The process of claim 8, wherein said particle size ranges from 0.1 to 1.0 microns.

10. The process of claim 1 wherein said electrical conductor is an anode.

11. The process of claim 1 wherein said dispersion medium is selected from the group consisting of n-octyl alcohol, n-amyl alcohol, isobutyl alcohol, butyl acetate, isoamyl acetate, methyl acetate, ethyl acetate, cyclohexanone, methyl-n-propyl ketone, diisobutyl ketone, methyl ethyl ketone, acetone, acetophenone, butylcellosolve, epichlorohydrin, chloroform, 1,2-dichloroethane, 1,1,2-trichloroethane, tetrachloroethane, nitrobenzene, chlorobenzene, o-dichlorobenzene and mixtures thereof.

12. The process of claim 1, wherein the vinylidene fluoride resin has a specific viscosity of from 0.6 to 2.0.

13. The process of claim 1, wherein said organic liquid dispersing medium has a maximum dielectric constant of 150.

* * * * *